United States Patent [19]

Elliot et al.

[11] Patent Number: 5,142,627
[45] Date of Patent: Aug. 25, 1992

[54] FIP-COMPLIANT BLOCK MULTIPLEXOR CHANNEL INTERFACE OPERATIONAL METHOD FOR CACHE/DISK SUBSYSTEM

[75] Inventors: Kathleen Elliot, Harleysville; Kenneth L. Willis, North Wales, both of Pa.; Craig B. Johnson, Shoreview; Joseph E. Kessler, St. Anthony; Robert S. Yach, all of Minn.; James W. Adcock, Herndon, Va.

[73] Assignee: Unisys Corporation, Blue Bell, Pa.

[21] Appl. No.: 830,963

[22] Filed: Feb. 5, 1992

Related U.S. Application Data

[63] Continuation of Ser. No. 274,211, Nov. 17, 1988, abandoned.

[51] Int. Cl.$^5$ ............................................. G06F 13/14
[52] U.S. Cl. .................................... 395/275; 395/425; 395/575; 364/284.2; 364/254.3; 364/238; 364/243.4; 364/232.9; 364/265.1
[58] Field of Search .................. 395/275, 425, 575

[56] References Cited

U.S. PATENT DOCUMENTS

| | | | |
|---|---|---|---|
| 4,394,733 | 7/1983 | Swenson | 364/200 |
| 4,467,421 | 8/1984 | White | 364/200 |
| 4,546,430 | 10/1985 | Moore et al. | 364/200 |

Primary Examiner—Lawrence E. Anderson
Attorney, Agent, or Firm—Alfred W. Kozak; Mark T. Starr

[57] ABSTRACT

A procedure, enabled in software, and applied to a cache/disk environment controlled by a host computer operating through a Block Multiplexor Channel Interface and Storage Control Unit, functions to use FIPS 97 and FIPS 60 protocols to execute data transfers between host processors and a plurality of disks whereby simultaneous operations can function with up to 16 disk units. Up to seen I/O requests can be queued on each of the 16 disk units while the system can normally operate in the cache/disk mode. Additionally, the system can operate in the disk-only mode or storethrough mode.

4 Claims, 12 Drawing Sheets

8 BITS OF SUBCHANNEL ADDRESS (a) CC RR UUUU  WHERE CC = CONTROL UNIT SELECT
                      RR = REQUEST #
                      UUUU = UNIT #

THIS ALLOWS A COMMAND QUEUE DEPTH OF 3.

(b) C RRR UUUU  WHERE C = CONTROL UNIT SELECT
                      RRR = REQUEST #
                      UUUU = UNIT #

THIS ALLOWS A COMMAND QUEUE OF 7.

Fig. 5

SUBCHANNEL ALLOCATION TABLE

| | | | | | | | |
|---|---|---|---|---|---|---|---|
| 000 | CONTROL DEVICE | SSD 0 | SSD 1 | SSD 2 | SSD 3 | SSD 4 | SSD 5 | SSD 6 |
| 008 | SSD 7 | SSD 8 | SSD 9 | SSD 10 | SSD 11 | SSD 12 | SSD 13 | SSD 14 |
| 010 | DISK 0 REQ 1 | DISK 1 REQ 1 | DISK 2 REQ 1 | DISK 3 REQ 1 | DISK 4 REQ 1 | DISK 5 REQ 1 | DISK 6 REQ 1 | DISK 7 REQ 1 |
| 018 | DISK 8 REQ 1 | DISK 9 REQ 1 | DISK 10 REQ 1 | DISK 11 REQ 1 | DISK 12 REQ 1 | DISK 13 REQ 1 | DISK 14 REQ 1 | DISK 15 REQ 1 |
| 020 | DISK 0 REQ 2 | DISK 1 REQ 2 | DISK 2 REQ 2 | DISK 3 REQ 2 | DISK 4 REQ 2 | DISK 5 REQ 2 | DISK 6 REQ 2 | DISK 7 REQ 2 |
| 028 | DISK 8 REQ 2 | DISK 9 REQ 2 | DISK 10 REQ 2 | DISK 11 REQ 2 | DISK 12 REQ 2 | DISK 13 REQ 2 | DISK 14 REQ 2 | DISK 15 REQ 2 |
| 030 | DISK 0 REQ 3 | DISK 1 REQ 3 | DISK 2 REQ 3 | DISK 3 REQ 3 | DISK 4 REQ 3 | DISK 5 REQ 3 | DISK 6 REQ 3 | DISK 7 REQ 3 |
| 038 | DISK 8 REQ 3 | DISK 9 REQ 3 | DISK 10 REQ 3 | DISK 11 REQ 3 | DISK 12 REQ 3 | DISK 13 REQ 3 | DISK 14 REQ 3 | DISK 15 REQ 3 |
| 040 | DISK 0 REQ 4 | DISK 1 REQ 4 | DISK 2 REQ 4 | DISK 3 REQ 4 | DISK 4 REQ 4 | DISK 5 REQ 4 | DISK 6 REQ 4 | DISK 7 REQ 4 |
| 048 | DISK 8 REQ 4 | DISK 9 REQ 4 | DISK 10 REQ 4 | DISK 11 REQ 4 | DISK 12 REQ 4 | DISK 13 REQ 4 | DISK 14 REQ 4 | DISK 15 REQ 4 |
| 050 | DISK 0 REQ 5 | DISK 1 REQ 5 | DISK 2 REQ 5 | DISK 3 REQ 5 | DISK 4 REQ 5 | DISK 5 REQ 5 | DISK 6 REQ 5 | DISK 7 REQ 5 |
| 058 | DISK 8 REQ 5 | DISK 9 REQ 5 | DISK 10 REQ 5 | DISK 11 REQ 5 | DISK 12 REQ 5 | DISK 13 REQ 5 | DISK 14 REQ 5 | DISK 15 REQ 5 |
| 060 | DISK 0 REQ 6 | DISK 1 REQ 6 | DISK 2 REQ 6 | DISK 3 REQ 6 | DISK 4 REQ 6 | DISK 5 REQ 6 | DISK 6 REQ 6 | DISK 7 REQ 6 |
| 068 | DISK 8 REQ 6 | DISK 9 REQ 6 | DISK 10 REQ 6 | DISK 11 REQ 6 | DISK 12 REQ 6 | DISK 13 REQ 6 | DISK 14 REQ 6 | DISK 15 REQ 6 |
| 070 | DISK 0 REQ 7 | DISK 1 REQ 7 | DISK 2 REQ 7 | DISK 3 REQ 7 | DISK 4 REQ 7 | DISK 5 REQ 7 | DISK 6 REQ 7 | DISK 7 REQ 7 |
| 078 | DISK 8 REQ 7 | DISK 9 REQ 7 | DISK 10 REQ 7 | DISK 11 REQ 7 | DISK 12 REQ 7 | DISK 13 REQ 7 | DISK 14 REQ 7 | DISK 15 REQ 7 |

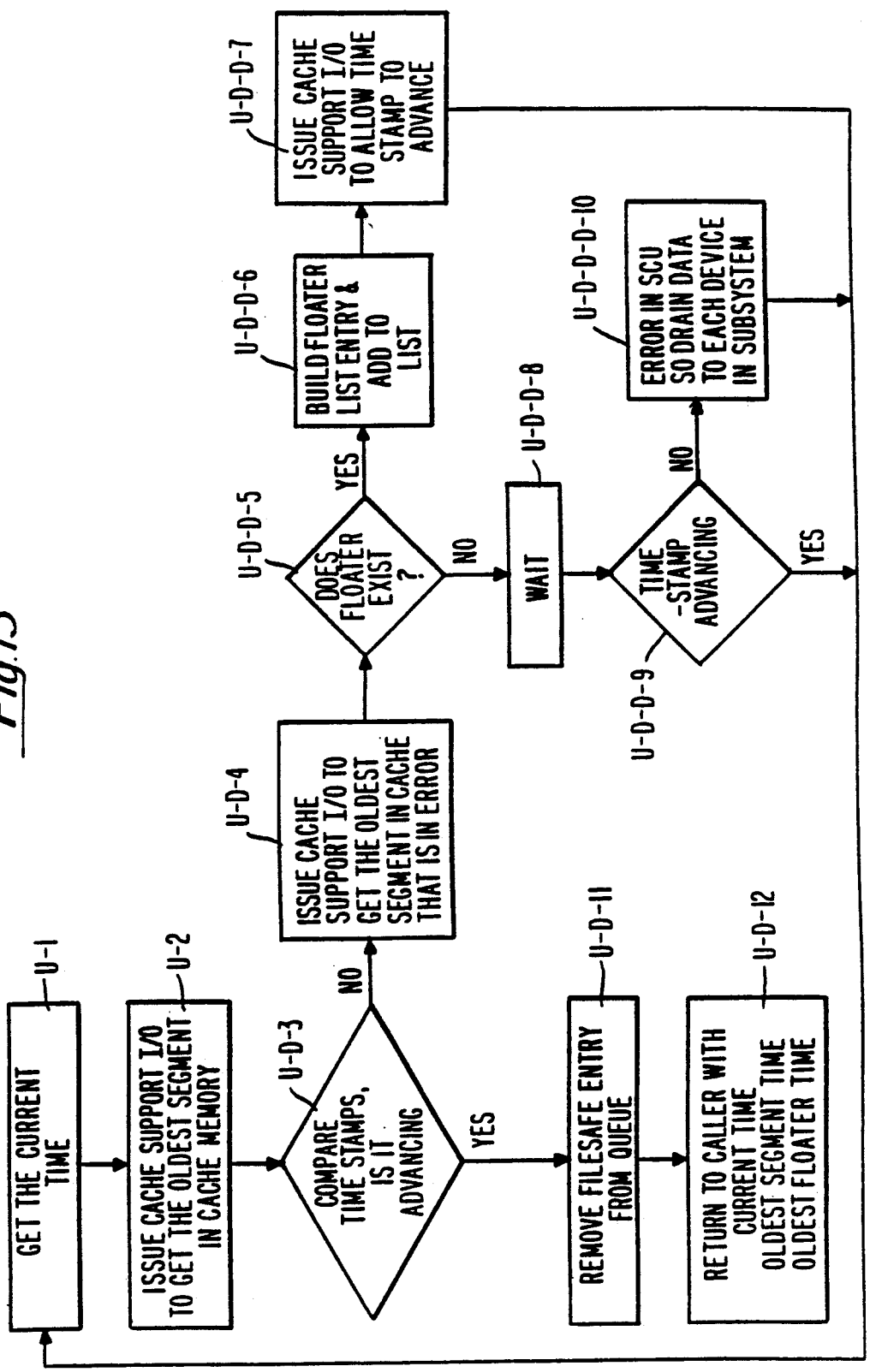

FIP-COMPLIANT BLOCK MULTIPLEXOR CHANNEL INTERFACE OPERATIONAL METHOD FOR CACHE/DISK SUBSYSTEM

This is a continuation of co-pending application Ser. No. 07/274,211 filed on Nov. 17, 1988, now abandoned.

FIELD OF THE INVENTION

This disclosure concerns software methods and means which are used in conjunction with a cache/disk subsystem for data transfer operations between a main host computer and a plurality of peripheral units which operate using the Federal Information Processing Standards (FIPS) Protocols.

BACKGROUND OF THE INVENTION

This disclosure relates to the methods associated with the transfer of data between a main host computer and one or more peripheral devices which operate under the protocols designated as Federal Information Protocol Standards, (FIPS).

The general environment involved herein is that shown in FIG. 1 of this disclosure which has been derived from U.S. Pat. No. 4,425,615, inventor Swenson, et al, and entitled: "Hierarchical Memory System Having Cache/Disk Subsystem with Command Queues for Plural Disks". This patent was assigned to the Sperry Corporation whose name was subsequently changed to the Unisys Corporation.

Additionally, this application is related to an application entitled "Cache Disk Subsystem Trickle" which was filed as U.S. Ser. No. 207,097 by the inventor, Robert E. Swenson, and which is now extant as U.S. Pat. No. 4,394,732.

These above-mentioned patents are considered to be incorporated herein by reference.

As delineated in the above-referenced patents, the basic environment involved in this system is one where one or more host processors, each having one or more input/output channels, communicate through one or more storage control units to utilize data recorded on a plurality of disk drives. The system provides a cache/-disk subsystem which includes one or more storage control units (SCU) and one or more cache storage units (CSU) used by the storage control units as cache memory for the rotating disks. The cache store is transparent to the user who programs the processor as though the user were directly addressing the disk drives.

Through developments in the art, it has become known to provide a smaller set associative cache memory enabling a much shorter and faster access time than from the main memory. When the processor issues a main memory address, this address is utilized to access an "address descriptor table" (ADT) which is normally set with associative relationships and contains words identifying which memory addresses are present in the cache memory.

Each entry in the table (ADT) also includes information identifying certain characteristics of the data at the associated addresses. If the addressed data is present in the cache memory, then a transfer is set up between the processor and the cache memory. If the data being addressed is not present in the cache memory, then it is retrieved from the main memory, entered into the cache memory, and then accessed for transfer to the processor.

General usage existed where the cache memory and the main memory were both wholly electronic; however, subsequent use has been made of the fully associative cache memory in conjunction with disk devices. Thus the described environment involves a cache memory for use with a plurality of disk devices such that I/O requests from a host processor to a target disk device will be transferred from the cache memory immediately if the requested data is in the cache memory, or will be queued by the storage control unit (SCU) for later execution if the data requested is not in the cache memory.

The attached Acronym Glossary will indicate the meaning of the listed items.

| ACRONYM GLOSSARY | |
|---|---|
| ADT | Address Descriptor Table |
| AGEOLD | Identifying old segment in Cache |
| BMC | Block Multiplexor Channel |
| CQ | Command Queue |
| CSU | Cache Storage Unit |
| CTLDEV | Control Device |
| FBCADIS | FIPS Block Multiplexor Channel Cache/Disk Software |
| FILESAFE | Action of returning data from Cache to Disk Memory |
| FIPS | Federal Information Processing Standards |
| I/O | Input/Output |
| IOP | Input/Output Processor |
| LRU | Least Recently Used |
| MRU | Most Recently Used |
| NSRI | Number of Segments to Roll In |
| SB | Staging Buffer |
| SCU | Storage Control Unit |
| SDT | Segment Descriptor Table |
| SSD | Solid State Disk |
| SYSOLD | Action of finding the oldest segment in Cache Memory |
| UPDATE | Action of comparing present time data with oldest time date in cache |
| URP | Unit Request Packet |
| UST | Unit Status Table |
| WT | Written-To |

As seen in FIG. 1, the environment of this system includes first and second storage control units (SCU) 100 and 102, and a plurality of cache storage units (CSU) 104 and 106, and a plurality of rotating disk device drive units which are shown as disk drives 108 and 110. The SCU 100 and 102 are identical units, but are illustrated differently to show aspects of the details involved. With reference to SCU 100, each SCU may service up to four channels designated channels A through D. The SCU 100 includes four channel interfaces, designated channel interface A through D for interfacing channels A through D to a processor $112_p$ and control store $112_c$ within the SCU. Each SCU is provided with a control interface 122 for interfacing the CSU 104, and CSU 106 to the processor $112_p$ and the control circuitry $112_c$ and a device interface 124 interfaces the processor and control circuits 112, to the disk drives 108, 110, (disk units 0-15).

Each CSU (104, 106) may be provided with four ports designated port 0-port 3. As seen in FIG. 1, SCU 100 is connected to port 0 of each CSU, and the SCU 102 is connected to port 1 of each CSU with ports 2 and 3 being unused.

For example, a typical cache/disk subsystem includes from one to four CSU's, and the amount of cache storage can vary within a storage unit and also can vary based on the number of storage units.

As seen in FIG. 1, the CSU 104 is provided with a Segment Descriptor Table (SDT) 126 capable of storing up to 254 kilobytes of information related to identifying the data stored in cache storage. If all of the CSU's 104, 106 are "shared", then a single SDT in one CSU stores the information relating to identifying the segments of data stored in all of the CSU's.

However, if the cache memory (CSU 104, 106) is partitioned into two or more groups of CSU's, then there must be an SDT for each group. Thus, if SCU 100 is connected only to CSU 104, and SCU 102 is connected to CSU 106, then both CSU's 104 and 106 must contain an SDT, as the SDT 126, FIG. 1.

The device interface 124 in FIG. 1 operates to service a maximum of 16 disk drives, all of which are of the same type. However, it is not possible to intermix disk drives of different types in a single bank. The disk utilized by the cache/disk subsystem is designated as the 8481M which is marketed by Unisys Corporation. However, other types of disk drives may also be utilized.

The lower half of FIG. 1 illustrates the flow of data between the channels, the CSU (104, 106) and the disk drives. Generally, when a channel wishes to read or write on a disk, it issues a FIPS 97 compliant command sequence which, among other things, specifies: the operation to be performed, the address of the disk drive containing the data to be involved in the transfer, the number of blocks to be transferred, and the disk relative logical block address where transfer is to begin.

The unit of data transfer between the SCU 102 and the disks, and between the control unit and the cache, is called a "segment" when the subsystem is operating in a "cache mode". A segment contains 8,192 bytes of data. On the Unisys Series 1100 systems, only the first 8,064 bytes contain valid data. The subsystem logic does not support segments of any size other than 8,192 bytes. The segments are blocked together to optimize the staging of data.

Thus, when the channel is granted access to the SCU, as 102, the command sequence is sent from one of the channel interfaces 114, 116, 118, 120 to the processor $112_p$ in the SCU 102. The SCU processor $112_p$ accesses the SDT 126 through the control interface 122 for the purpose of determining if segment(s) containing the disk addresses, involved in the transfer, are presently contained in the cache memory CSU 104, 106. If the addresses to be involved in the transfer are present in the segments in cache memory (called a "hit"), the processor $112_p$ causes the segment to be "read" from the cache memory into a staging buffer 132.

If the command from the channel interfaces 114, 116, 118, 120 specifies a "Read" operation and the requested data resides in the CSU 104, 106, the data is transferred from the CSU through the control interface 122 to the staging buffer (SB) 132 and from the SB over bus 128 (data bus) to the block MUX channel buffer (130, FIG. 4) and from the block MUX channel buffer to the channel. This constitutes a "hit".

On the other hand, if the command sequence specifies a "Write" operation, the SCU processor $112_p$ directs the data be taken from the channel interfaces (114, 116, 118, 120) to the SB 132 and then from the SB through the control interface 122 to the CSU 104, 106.

Now, if, at the time the SCU processor $112_p$ examines the SDT 126, it determines that the segment containing the required addresses is not resident in the cache storage, (called a "miss"), then the SCU processor $112_p$ acts through the device interface 124 to then access the disk drive containing the required locations. The segment containing the required locations plus additional adjacent segments are then read from the disk drive through the device interface 124 to the SB 132, and then through the control interface 122 to the cache memory, CSU 104, 106. The number of segments to roll in (NSRI) is based on SCU estimation or speculation. The segment is also read from the SB 132 to the block MUX channel buffer (130, FIG. 4) and from the block MUX channel buffer to the channel.

When the device address is for a rotating disk and the subsystem is "not caching", the SCU 102 will initiate positioning on the disk unit and return "Channel End" status. If the device address is for a rotating disk and the subsystem is "caching" and this request results in a cache "miss" condition, then the SCU 102 will place the request on the command queue and then return "Channel End" status and disconnect from the channel. The SCU 102, after disconnecting from the channel, will be prepared to accept an initial selection sequence for a different device or request number on the channel interface without presenting a control unit "busy sequence". The subsystem, when caching, will accept up to seven requests per rotating disk unit. Both of the previous cases will present "Device End" status to the LOCATE command after the unit is positioned and the unit is ready to transfer data.

The cache storage unit (CSU) can also act as a disk device known as "Solid State Disk" (SSD) which provides requested data with zero latency (no seek time). A maximum of 15 SSD's are supported.

When the device address is for a SSD (simulated in electronic memory) or if the subsystem is "caching" and the request will result in a cache "hit" condition, the SCU 102 will present "Channel End", "Device End" status, to the LOCATE command.

The above description is meant to illustrate the point that the cache storage is "transparent" to the user. Thus, the program used by the user is written as though the commands were addressing the disk drives directly, and the user is unaware of the operation of the intervening "cache memory", i.e. cache storage units 104, 106.

It may be noted that, generally, data transfers initiated by the host processor 10 do not start or finish exactly on the segment boundaries. Since the cache and the disks can only be addressed by full segments, it is necessary to first bring the entire required segment into one of the 8K-byte buffers in the control unit SCU 102, then alter or extract from this buffer the data desired, and then, if a Write command is extant, return the updated segment back to the appropriate disk device at a later time. This operation is denoted as "trickle".

For many applications, statistics indicate that if a request is received for data residing in one segment on a disk, then there is a "high probability" that a request is very soon to be made for data in segments immediately following this segment. By taking advantage of this phenomena, whenever a segment is read from disk to cache, then additional segments are read into the cache on the speculation that they also will be needed. The number that is read in, is the difference between a parameter (number of segments to roll in [NSRI]) specified by software and the number of segments rolled in as a result of "misses". For example, if a request called for three segments to be accessed, all three of which result in "misses", and also the parameter NSRI was set at four, then the number which i read in by "speculation" is $4-3=1$ segment.

Because these additional segments are considered speculative and may or may not be used, they are assigned an "older" age than the segments that were actually requested. All segments in the cache are linked together by "age" in the SDT 126 called the "Segment Descriptor Table" (SDT). The links extend from the "most recently used" (MRU) segments down to the "least recently used" (LRU). Once the cache (CSU 104, 106) has been filled, segment entries are removed from the SDT, starting at the LRU entry, to make room for the new data. Each time a segment in cache is referenced by a normal Read or Write operation, its entry in the SDT is advanced to the MRU position in the "age chain".

In order to maintain available space in the cache (CSU) for new data, there is a special operation called a "trickle" which is performed by the subsystem. During periods when the control unit SCU 102 is idle, it links through the SDT 126, looking for segments that have been altered while residing in the cache and which, therefore, do not have a "current copy" residing on the disk. When a "written-to" flag is detected denoting such a condition, the corresponding segment is then written out to the appropriate disk and the flag is cleared. The segment still remains also in the cache and is available if requested by the processor (host 10), provided the "ageing process" has not replaced it with another segment. This system has been described in U.S. patent application Ser. No. 207,097 by the aforementioned Robert W. Swenson, which issued as U.S. Pat. No. 4,394,372.

When a segment is "written-to" (WT) the first time, a "time stamp" is inserted in the SDT entry. This time stamp is supplied by the software. For every Read or Write I/O request in a post-store cache mode, the time stamp and file number (for the I/O request) is included in a "SET DIAGNOSE Command" and "Define Modifiers" subcommand parameters. The time stamp entries are linked together starting with the oldest and ending with the newest. The time stamp links are used by the SCU to search for segments to "trickle". The time stamp of the oldest WT (updated) segment, together with the "AGEOLD" parameter are used to determine the execution priority of the trickle function. By periodically (when the control unit SCU 102 is idle) reading the time stamp of the oldest WT segment, the software constantly monitors the progress of trickling by the SCU 102, 100.

To aid in error recovery when an SDT error occurs, a copy of the SDT is contained in the unused space of the cache modules. This space is the remaining 128 bytes that are not normally used out of each 8,192-byte segment. If an SDT error occurs, the SCU 102 quits accepting requests from the host and returns a special status. The software then initiates the "de-stage" of all the cache segments using the SDT copy in the cache. De-staging involves transferring all written-to (WT) data from cache to the disk. This procedure allows for recovery of all data resident in the cache if an "SDT Only" error occurs.

EXECUTIVE PROGRAM

The Series 1100 operating system of Unisys supports the following cache/disk subsystem configurations: (i) cache/disk configuration—where cache memory and disks are configured. All memory modules are configured as cache memory; (ii) mixed cache/disk and solid state simulated disk (SSD) configuration—where cache memory, disks, and SSD units are configured; (iii) "disk-only" configuration—all memory modules are configured as SSD units, and disks units are configured.

Configurations (i) and (ii) above can be run in the "disk-only" mode when the cache memory is not available or when the operator issues a "denial" of the cache memory.

The environment of the described cache/disk subsystem as described above includes a plurality of disk drives, one or more storage control units interconnecting the disk drives to one or more processors through one or more channels, and a plurality of CSU's, one or more SCU's including means for determining if requested data is now present in a CSU, means for transferring the requested data from the CSU to a channel if the requested data is present in the CSU, means for addressing a selected disk drive to obtain the requested data if the requested data is not present in the CSU, and then means for transferring the requested data from the selected disk drive to the particular processor that is requesting it, while simultaneously entering the requested data into the CSU.

The cache/disk SCU 102 in FIG. 2 attaches to the block MUX channel 202 (compliant with FIPS 60) and complies with FIPS 97 Class "B" in supporting full cache/disk functionality.

The maximum number of subchannels within a block MUX channel that are utilized by the SCU is 128 subchannels.

These are organized into groups of seven subchannels per each rotating disk (total: 112 subchannels). There is one subchannel for each SSD (cache memory) for a total of 15 subchannels (FIG. 5) and one subchannel for the control device (SCU 102).

The group of seven subchannels for each disk is the maximum command queue depth. There is one command queue per each rotating disk.

The software selects the first available subchannel within the group of seven subchannels. The command queue depth and request numbers are analogous.

A "Request No. Mask" in the software determines which subchannel is available for use.

A feature of the system of FIG. 2 operates such that an SCU (as for example SCU 102) may initiate an I/O operation and place the I/O on the command queue (Miss) and the other SCU,(as SCU 100, for example) when servicing the command queue, actually completes the I/O. This particular feature is only used on systems that support Dynamic Path Selection.

A load balancing feature of the system operates via software such that the number of I/O requests to each SCU (102 and 100) in each cache/disk subsystem are "equalized" in the amount of I/O requests directed to each of the two SCU's.

Another feature of the block multiplexor channel interface (BMC 202) is called "Device Path Selection" which allows an I/O operation that was started by one control unit to be assumed by a different control unit (Untagged Device End Support).

The command queue allows the system to function with up to seven I/O requests per each one of the rotating disk units.

The cache/disk system, when caching, has a command queue which is allocated eight slots for each disk drive. The eight slots per drive is selected by the request number associated with the device address and a request "zero" is reserved for trickle operations. The command queue is only utilized for a host command if there is a disk access (miss, storethrough, dispersed).

If the host command will result in a "miss" (specified disk address not in cache), then the command will be placed on the command queue. If this is the only command for this unit on the command queue, then (the unit must be idle) a Read command is initiated to a disk control module (CM, FIGS. 2, 4) prior to Channel End status being presented to the block MUX channel. The Channel End status being presented allows the control unit (SCU 102) to accept another command from the block MUX channel (SIOF stack) or to service another attention request from a disk control module.

When a storage control unit as SCU 102 is servicing an attention interrupt from a disk control module (CM. FIG. 4) and the active command queue entry is not a "trickle", then it will reconnect to the Block MUX channel using a storage control unit-initiated sequence and will present the device address associated with the active command queue entry at Address-In-Time. The status of Device End will be presented at Status-In-Time allowing the block MUX channel to initiate the next command in the chain of commands.

When the chained Read/Write command is complete, then the command queue entry will be deleted and if any other command queue entries for this disk drive are available, and if the command queue entry is for request numbers one through seven, then the disk control module (CM, FIG. 4) will be initiated for a Read. If the available command queue entry for the unit is request number "zero" (trickle), then the control module will be initiated for a Write.

The case may exist where the processing of a command queue entry will result in staging of data required by a different request number. This entry will be processed after the ending status to the last command in the command chain is presented. (Service Out and not Suppress Out response to Status In).

The command queue is serviced by priority and then in rotation within the priority level. The host operating system sets the priority in the Define Modifier parameters. This is fixed at the current software level to a priority of "six" which is one step above a low priority trickle. The storage control unit (SCU) can escalate the priority of the trickle if the oldest "written-to's" age (age equals current time stamp minus time stamp value at the time of the Write) exceeds the AGEOLD parameter value by the following amounts:

2×AGEOLD=priority 5

4×AGEOLD=priority 3

1×AGEOLD=priority 1

If the oldest "written-to's" age is less than two times AGEOLD, then the trickle priority will remain at level seven with one exception, and that is, if the percentage of "written-to" segments (WT) exceeds a control unit determined level, then the priority will be escalated to the highest priority level.

SUMMARY OF THE INVENTION

While previously designed Sperry (Unisys) disk cache systems operated on a word-transfer basis using a word channel, the presently described system and method involves a disk cache system which works with the FIPS protocol and operates on a "block multiplexor" basis rather than a non-block multiplexor basis.

The enhancement to the system involves the introduction of caching within a FIPS standard programming protocol which introduces a major change in the microcode of the subsystem. Additionally, this enhancement operates to protect any past investment in hardware, firmware and software development that was previously used with these systems. In doing this, the firmware and software were required to adapt to the physical interface required. The logical level within the operating system is maintained.

It is also required in this system that the FIPS protocol also support a "post store" (write) cache.

The newly extended FIPS protocol was enhanced to enable a "Post Store Caching" mode and to continue in that mode until such time as the mode of operation is terminated by operator action or a fatal subsystem failure.

The Executive software of the Unisys Series-1100 computer requires a software adaptation in order to handle record blocking in the main memory (Read before Write) because the FIPS standard requires a "block" addressing interface. The priorly developed Word Channel Cache product (5056) maintained an addressing interface at the level of one 36-bit word. Now, because the FIPS 97 standard mandates a whole byte content, and because of the trade-offs required in microcode implementation, then the addressing level is defined at a 28-word (36-bit) level. This provides for a logical block size of 126 bytes. (28 words, each of 36 bits, for a total of 1008 bits. This provides 126 bytes of 8 bits each).

The presently described software system and method included herein indicate the sequential steps required in the system to provide for operation of the block multiplexor channel interface for the cache/disk subsystem for operation with the extended FIPS 97 protocol.

The software developed herein is designated as the FIPS BMC Cache/Disk Software and given the acronym FBCADIS (which indicates FIPS block multiplexor channel cache/disk). It satisfies the requirements for a high-performance cache/disk subsystem which complies with the federal government's Federal information Processing Standards (FIPS).

FBCADIS supports three modes of operation: (1) post-store cache, (2) storethrough cache, and (3) disk-only. The FBCADIS software is supported on the Unisys 1100/60/70/80/90 operating systems. It requires the attachment of a 5056-22/23 storage control unit, a 7053 storage unit and 8481/9494-24 type disk drives. Early in development, the 5056-22/23 was known as 5056-12/13.

FBCADIS is the first software feature to support a post-store cache/disk subsystem that is compliant with the federal government standards (FIPS). FBCADIS supports a cache/disk subsystem that provides I/O throughput as much as four times greater than a conventional disk subsystem.

BRIEF DESCRIPTION OF THE DRAWINGS

FIG. 5 is a drawing illustrating the subchannel allocation table;

FIGS. 7-13 are flow charts showing the program sequence of steps used in the operation of the block multiplexor channel-I/O processor operating on the cache/disk environment.

GENERAL OVERVIEW

A cache/disk subsystem contains two levels of storage: a slow-access, large-capacity disk, and the relatively fast-access, smaller-capacity, solid-state "electronic storage" for cache. Whenever the host processor 10 requests data from the subsystem, it is obtained from the cache (104, 106, FIG. 1), if available. If not available, it is obtained from the disk drive units 108, 110, FIG. 1. Consequently, any improvement in performance of a cache/disk arrangement over a standard subsystem using only disks, requires the use of multiple subchannels simultaneously per disk, and that a high percentage of the data requested by the host processor 10, be "residing" in the cache at the time that it is requested, thereby eliminating the longer requirement and burdensome task of obtaining the data from the disks.

The presently described operational method is unique in providing the command queue/subchannel arrangement to allow concurrent and useful simultaneous operations while data is being staged for an initial I/O operation. For example, if a "miss" occurs, the SCU (102, 100) will immediately function to process another waiting I/O request.

The probability that the data is in the cache varies with the type of application, but normally is high in batch operations where sequential file accessing is extensively used.

Conversely, in a "transaction" environment, where files are generally accessed in a random manner, the "probability" of the data residing in the cache may be quite low and performance may fall below that of a standard disk subsystem. The threshold that has been established to determine where the cache/disk performance exceeds that of a standard subsystem involves the concept of a "hit" rate of roughly 60 percent.

SOLID STATE SIMULATED DISK CONFIGURATION (SSD)

Figure 1:
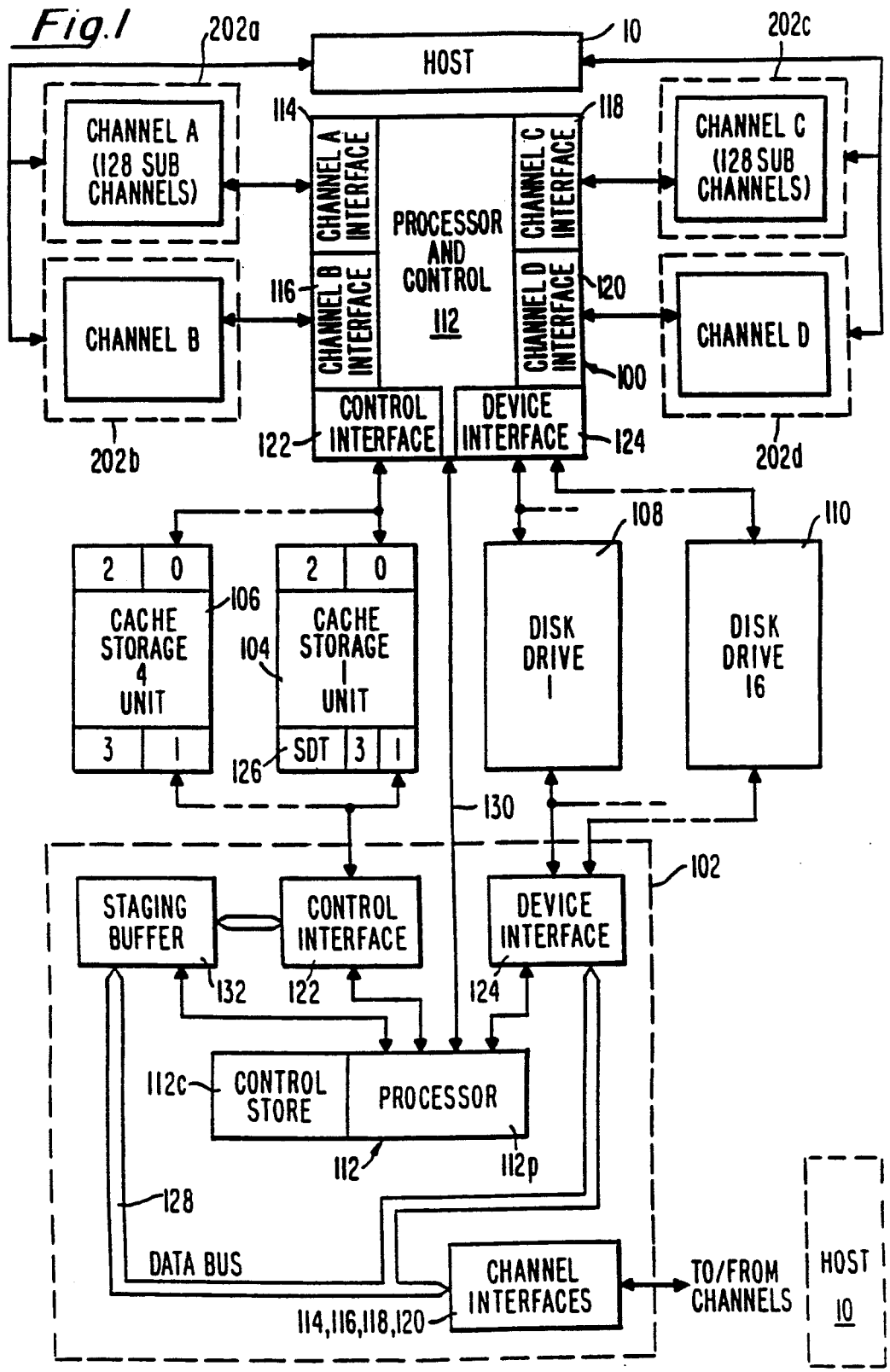
FIG. 1 is an overall block diagram showing the major elements of a cache disk subsystem.

This is provided by the CSU's 104 and 106 of FIG. 1. The CSU can be used either for cache or for solid state disk (SSD).

The SSD unit appears to software as a disk unit with a variable capacity and zero latency. The simulated "disk" is prepared via a disk preparation program to write the label "VOL I" and the appropriate volume directory on the unit. The SSD unit is supported as a logically fixed or removable disk. Due to the existence of the label and the directory tracks on the unit, some of the software tracks are reserved by the Executive program and thus are not available to users. The SSD is assumed to have 28-word (36 bit) addressing level.

CONTROL DEVICE (CTLDEV) CONFIGURATION

The control device (SCU) supplies the addressed personality of the total cache/SSD subsystem. All system-controlled parameters of the cache/SSD system are set by commands to the SCU control device. This includes performance tuning AGEOLD, NSRI, BYPASS as well as configuration descriptions, (e.g., cache memory unit enabled/disabled, SSD unit enabled).

There is a logical control device (CTLDEV) in the SCU configured for each cache/disk subsystem. This unit is used to do control type I/O functions to a cache/disk subsystem. There is a file name associated with the CTLDEV for each subsystem and this unit is always assigned to the Executive program. The CTLDEV (in the SCU) is assigned before the system attempts to recover the permanent files (catalogued files) as a part of the system's initialization procedure (IPL). The logical (non-data) file names (for the SCU) are used in the operating system I/O packets to do control function I/O's to the cache/disk subsystems. The files are established prior to the catalog file recovery to establish the physical environment of the cache/disk subsystem to recover data residing in cache for the catalogued files. A CTLDEV is exclusively assigned to the operating system (Executive) program. The CTLDEV is not available to the end user.

In the I/O functions, there are certain features which are used to support the cache/disk subsystem. These include: Command Queueing (for subchannels); Untagged Device End and Device Path Selection Support; Unit Number; Command Chain; Time stamp; Post Store/Storethrough Cache Mode.

Command queueing refers to the ability of the cache/disk subsystem to be addressed by seven I/O subchannels for each physical rotating disk device. Multiple requests to a "busy" disk unit are issued by the host I/O with the intention of completing I/O requests for data which reside in cache 104. These "hits" may be completed while the disk heads are already moving for another I/O request. The multiple requests for a single device are differentiated by a 3-bit request number field (RRR) (FIG. 6) which is sent out to the subsystem as part of the subchannel address.

The Executive program handles the command queue in a particular manner. A table structure (Unit Status Table) is set up to retain the command queue for each physical disk device. Each unit status table (UST) has, in addition seven substructures called Unit Request Packets (URP). Each of the URP's contain the control information which is necessary to keep track of the I/O request which is active in the block MUX channel 202 and subsystem (cache/disk) with this request number. The selection of one of the seven URP of a UST is accomplished by means of an "URP Idle" mask analogous to the command queue. Each Request number is associated with a unique 8-bit FIPS subchannel address. Each of the seven request numbers is associated with one physical rotating disk.

The Operating System FIPS Channel Driver is a piece of operating system that manages the channel communication which has one more level of "path selection" to perform before issuing the FIPS Channel Program (I/O request). If all seven subchannels to the device request numbers are in use, the I/O requests are queued in the host I/O. Upon receiving an interrupt, the request number is also returned, providing the Executive program with a link to the channel program for which the interrupt is being presented, and an available subchannel to issue the first I/O queued to the disk unit.

UNTAGGED DEVICE END (UTDE) AND DEVICE PATH SELECTION (DPS) SUPPORT

The support of the cache/disk subsystem includes the support of the UTDE feature of the cache unit.

Previous disk subsystems returned subsystem Disconnect Commands such as seek-complete Device End's onto the same SCU over which the seek command was received. The present SCU (5057B) includes the Untagged Device End. Functionally, when in the cache mode, the SCU 102 always uses "untagged seeks" (disconnections). The "Untagged Device End" means that upon completion of a seek (disconnect) operation, the disk drive is allowed to present a "seek-complete" (reconnection) signal to either one of the SCU's in a dual access subsystem. The algorithm in the disk unit is one which selects a "non-busy" SCU. The result of this is a more even loading in the subsystem, and, thus, a better average service time. Control of Untagged Device Ends is both a function of the SCU 102 and the host software. The software is responsible for initialization of the control unit ports over which the UTDE's may be presented.

UNIT NUMBER

In the earlier "word interface" cache/disk units, the unit number was specified in the first of the five External Function (EF) words issued to the channel. In the presently described block MUX channel protocol, the unit number (device address along with the Request No. and Channel Select) is specified in the Channel Access Word (CAW) when the command chain is issued to the channel, and to the SCU 102.

COMMAND CHAIN

The Command Chains are of a form similar to the earlier types of FIPS 97, non-shared command chains. The major difference is that the cache command chain will include a Set Diagnose/Define Modifiers (extended FIPS 97) command chained from the Define Extent Command. The parameter packet associated with the Set Diagnose/Define Modifiers command contains the parameters required for the Post-Store Cache Mode, such as file number, time stamp, priority, temporary, or catalogued file, etc.

The extended FIPS 97 Command Protocol provides a mechanism to collect performance data for the cache/disk system via the Set Diagnose/Read Instrumentation Command. This command is appended to the end of the command chain for all Read or Write operations when Software Instrumentation is enabled in the host operating system. A Software Instrumentation Package (SIP) provides cache "hit" or "miss" statistics within the subsystem.

BLOCK ADDRESSING

The previously developed word interface cache/disk (5057) had a "word address" specified in the EF words. The Read-before-Write needed to update a physical disk record was handled by the storage control unit (SCU 102), and transparent to the software.

In the presently described FIPS BMC Cache/Disk system (5057B), all requests, including those for the SSD, must start and must end on "28-word block" boundaries. This is the logical addressing format used within the Operating System. The other logical addressing format used within the operating system is "word" addressing. To achieve "word" address selection, the software "Reads-before-Writes" must be done to align a user's word specification to the "28-word block" boundaries in those cases when they don't match.

BLOCK MULTIPLEXOR

The previously developed cache/disk (with the 5057 SCU) was attached to the host processor 10 via the Unisys "word" channel interface. A word external function (EF) command sequence was used to issue the cache-type Read and Write commands to the subsystems.

The presently described cache/disk control unit (5057B) attaches to a FIPS 60 block MUX channel (compliant with FIPS 60 protocol) and also complies with FIPS 97, Class "B" Protocol supporting the full cache/disk functionality.

Even though there are many major differences between the two channel-driving protocols, the block MUX cache/disk interface has been designed in such a way that it can use the previous "word" interface and logical level operations.

Figure 2:
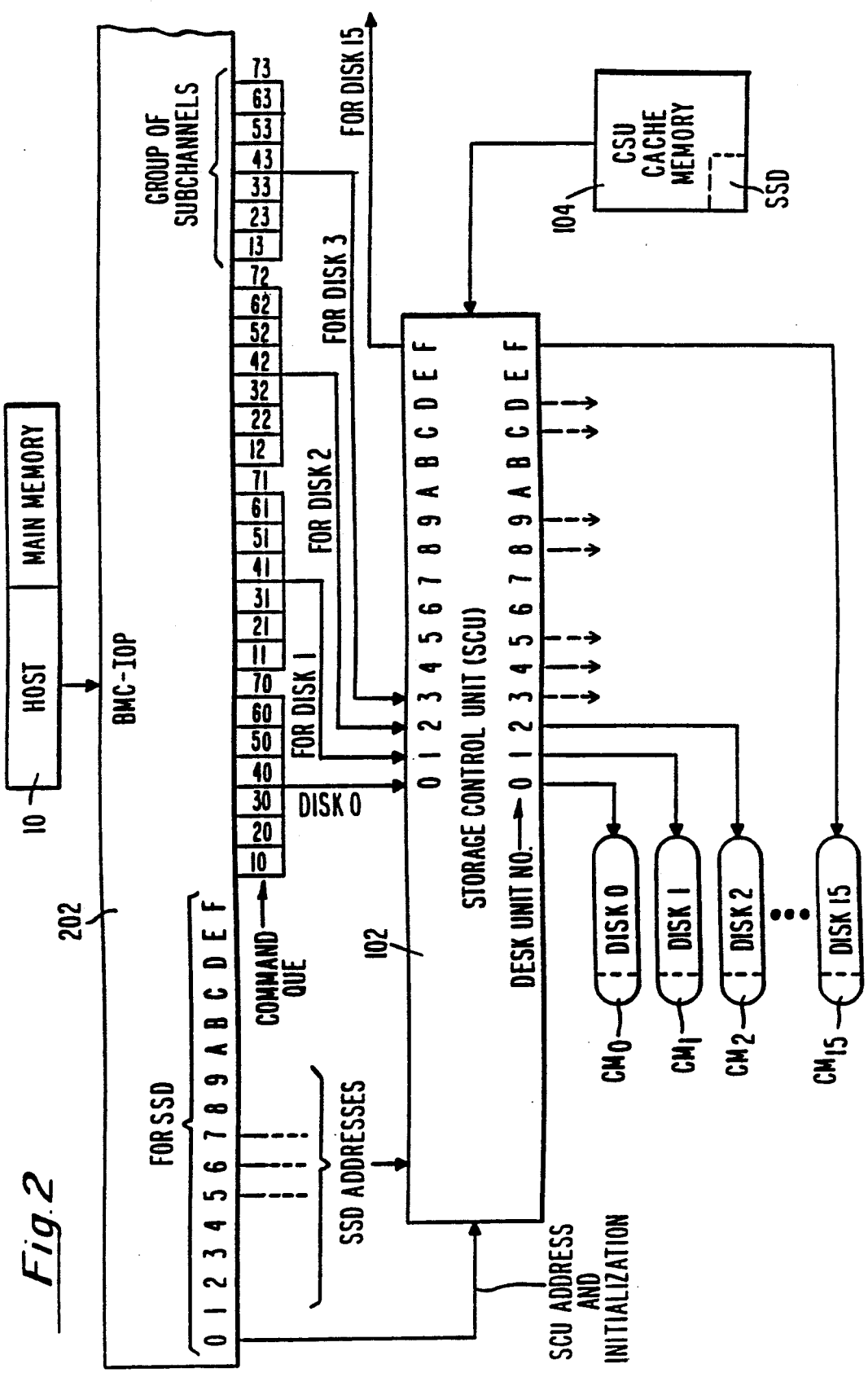
FIG. 2 is a schematic drawing illustrating connective relationships between the block multiplexor channels of an I/O processor and the storage control unit (SCU), cache memory and disk modules.

The cache/disk software designated FBCADIS involves the use of FIPS protocol whereby the host computer uses the FIPS 60 protocol which is used to format the command parameters to the block MUX channel interface (BMC-IOP 202). The BMC interface 202 (interfaces 202a, 202b, etc.) then provides a different format using FIPS protocol to the SCU 102. The SCU 102 provides a connection to the cache memory 104 and to a series of 16 disk units, as seen in FIG. 2.

To implement the "post-store cache", there were developed new cache support commands using the "SET DIAGNOSE" command which enabled the system to supply the necessary information for the post-store cache. The "SET DIAGNOSE" was an additional command which was used to provide control for the SCU 102. The SET DIAGNOSE command specifies a "Define Modifiers" subcommand. This new command provided the SCU 102 with the capability of the Post-Store cache operation which required certain parameters designated as follows:

(a) TIME STAMP: Time-date of block of data in Cache Memory. This is used as indicated in FIG. 14, discussed hereinafter.

(b) FILE NUMBER: This is the software file pointer in the User's I/O packet.

(c) PRIORITY FIELD: This defines the order of execution on the Command Queue.

(d) FUNCTION FIELD: Determines (i) store-through while trickle occurs; (ii) disk only mode; (iii) bypass-cache operation; (iv) normal post-store cache operation.

(e) READ LOCK: This prevents areas of cache or disk from being accessed by more than one storage control unit simultaneously.

There are two kinds of data or two categories of data involved in this system. These are (i) Independent Data and (ii) Device Dependent Data. The "Independent Data" is of a general nature and involves the following:

(a) READ (User I/O Packet function)
(b) WRITE (User I/O Packet function)
(c) RELATIVE ADDRESS (word) on the disk
(d) ADDRESS in MAIN MEMORY of Host The "Device-Dependent" Data involves a device specific physical unit routed via the "channel command word" which is designated as CCW. The CCW is derived from the host computer 10 which is operated to conform to FIPS 97. Host 10 provides a series of commands for the execution of I/O operations to the specific disk. It functions to provide and select a channel in the BMC-IOP 202 (FIG. 2) which then provides a connection to the SCU 102.

Another feature of the BMC-IOP 202 is that it supports "data streaming" which permits data to be transferred at a control unit fixed rate independent of signal turnaround or cable length delays.

DESCRIPTION OF PREFERRED EMBODIMENT

As seen in FIG. 2, the main host computer 10 is connected to the BMC-IOP 202. The BMC-IOP 202 is connected to the SCU 102 which fans out in a series of bus connections to a group of disks labeled Disk 0 through 15.

The host software, FBCADIS, issues a maximum of seven I/O requests per each rotating disk drive. Each of these I/O requests utilizes a unique subchannel of the BMC-IOP 202. The SCU 102 multiplexes these I/O requests. If the data requested resides in cache memory, such as unit 104 or 106 of FIGS. 1, 2, then immediate response is returned. If the data does not reside in cache memory, the appropriate disk is then referenced.

The SCU 102 multiplexes these I/O requests to optimize the performance. The data residing in each cache memory is "trickled" to disk which is controlled by a particular SCU, such as 102.

The BMC-IOP 202 operates in a device-dependent mode. This mode is also referred to as "non-shared". It allows multiple outstanding "Device End" statuses per each SCU (102, 100). This mode requires only one I/O to be initiated by the software per each request. This allows a higher throughput with minimal software overhead.

There is provided eight bits of "subchannel" address format as follows (shown in FIG. 6):

ccRRUUUU—where cc is the control unit select (SCU 100 or 102); and RR is the request number; and UUUU is the unit number. This allows a command queue depth of 3.

Figures 4, 6:
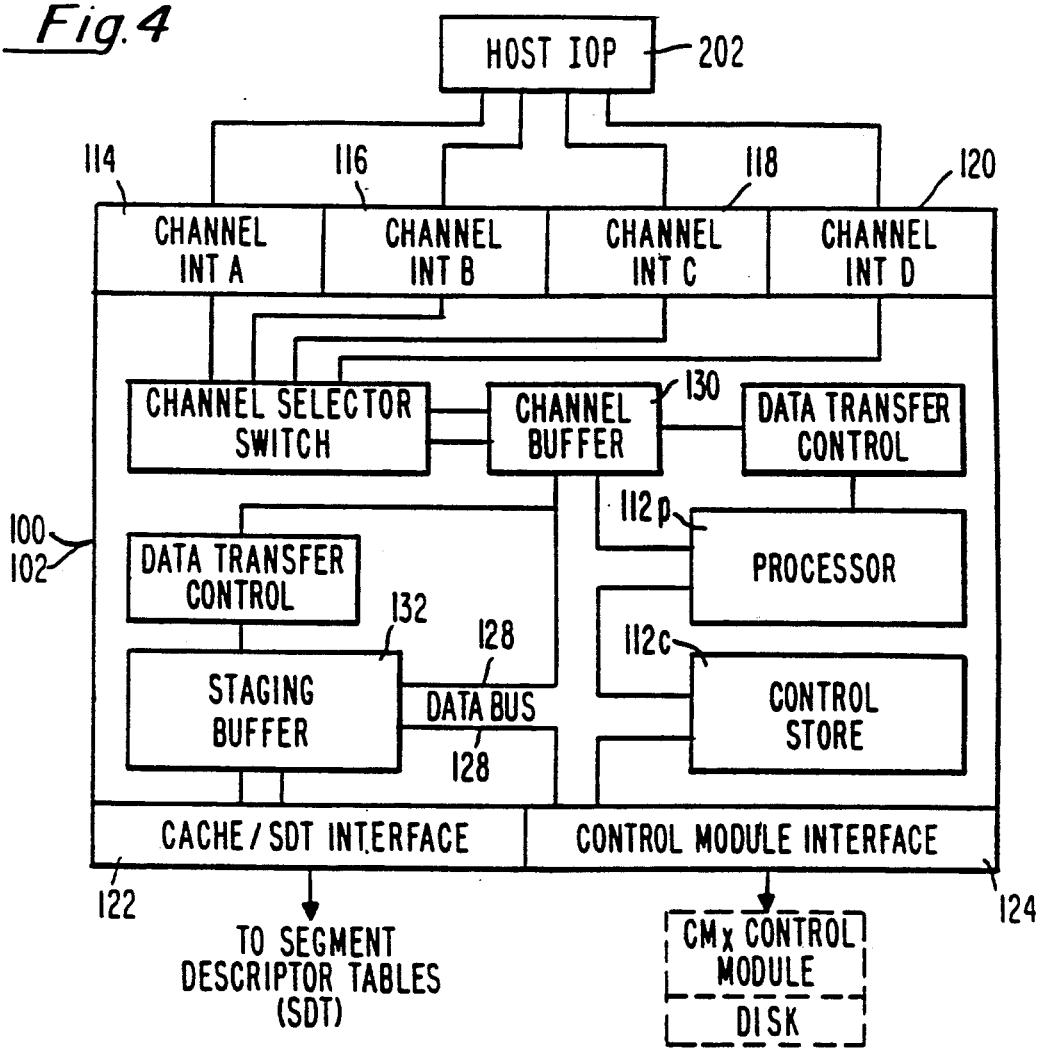
FIG. 4 is a block diagram showing more detailed functions of the SCU such as 100 and 102 (of FIG. 1)
FIG. 6 is a drawing showing the setup for the eight (8) bits of the subchannel address.

Another format is:

cRRRUUUU—where c equals the control unit (SCU 100 or 102) select; and RRR equals the request number; and UUUU equals the unit number. This allows a command queue depth of 7 and is indicated in FIG. 6.

To support multiple I/O requests per device for "caching", the subchannel address has been manipulated to include request numbers. The maximum requests that are supported are seven (7) for each disk unit. This allows for a command queue depth of 7 and utilizes 128 subchannel addresses per each cache/disk subsystem (up to 16 disks).

A command queue depth of 3 is also supported. This utilizes 64 subchannel addresses.

Figure 3:
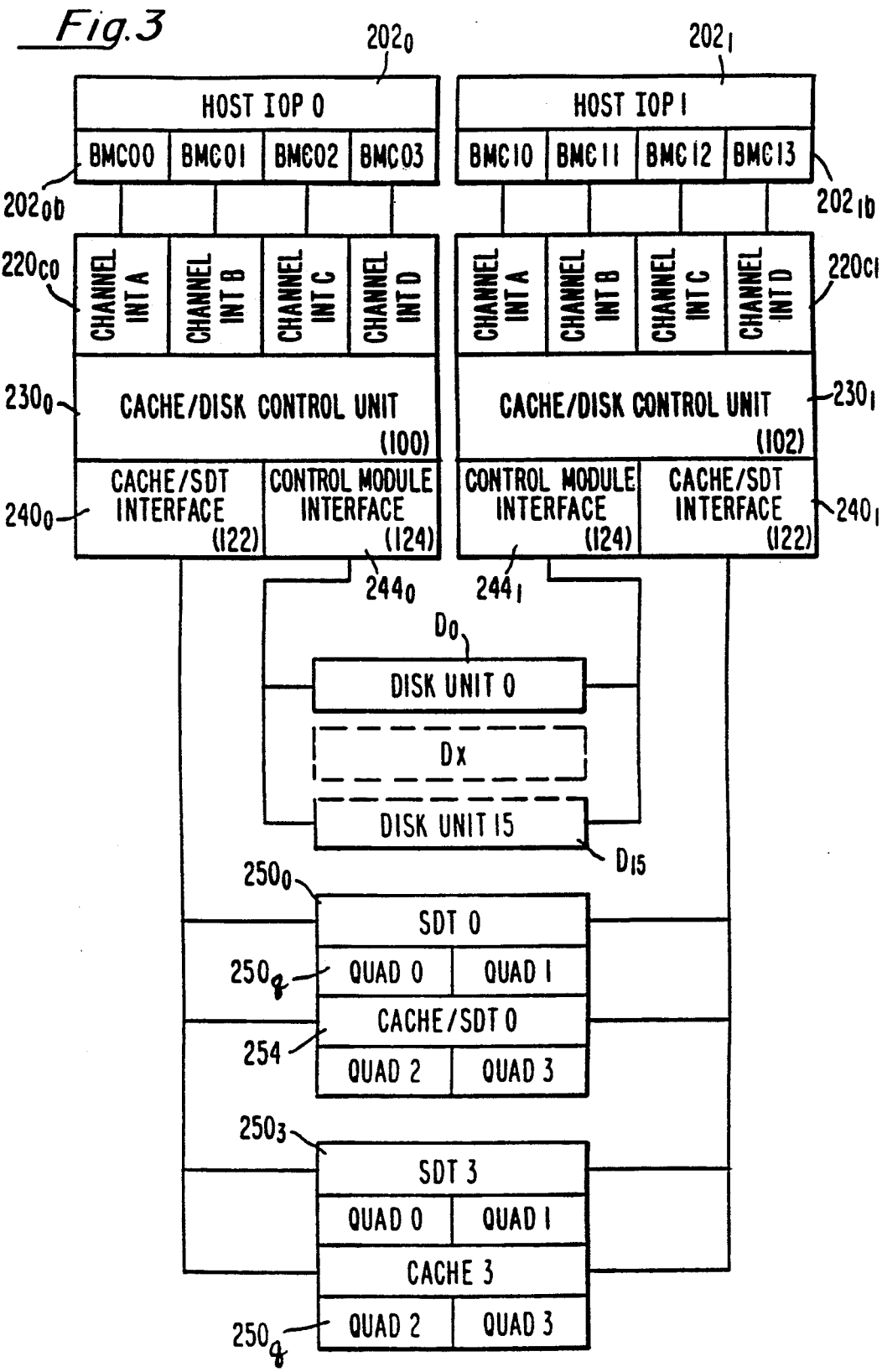
FIG. 3 is a block diagram showing the architecture for the software operations of the FBCADIS operational system.

In FIG. 3 there is shown an architectural arrangement where there are two host I/O processors (IOP) $202_0$ and $202_1$ which have channels designated as $202_{0b}$ and $202_{1b}$.

Each IOP has internal storage space (subchannels) which are reserved to store information about a channel program. The subchannel allocation is shown in FIG. 5 where 15 SSD (designated SSD 0 though 14) are used to function with 16 disk units, designated disk 0 through disk 15.

In FIG. 3, each IOP has four channel interface units ($220_{c0}$, and $220_{c1}$) which work with control units $230_0$ and $230_1$. These correlate to the storage control units of FIG. 1 shown as 100 and 102.

Then each cache/SDT interface ($240_0$, $240_1$) connects to a series of segment descriptor tables, SDT0 through $SDT_3(250_0-250_3)$.

Each control module interface ($244_0$, $244_1$) communicates with the series of 16 disk units, $D_0$ through $D_{15}$.

FIG. 4 is a more detailed block of the SCU 100, 102, which correlate to the FIG. 1 units of the device interface 124 (control module interface) and control interface 122 (cache/SDT interface) in addition to the channel A, B, C, D interfaces 114, 116, 118, 120.

In FIG. 5 showing the Subchannel Allocation Table, the left-hand column indicates the "channel numbers" such as, for example, where 010 is the channel for the first command request for disk 0, and the 011 would be the first command request for disk 1 and so on until 017 would be the first channel request for disk 7.

Referring to FIG. 2, there is seen the host computer 10 which is connected to the BMC-IOP 202 which operates on the FIPS 60 protocol.

The BMC interface 202 ($202_a$ through $202_d$, FIG. 1) is organized to provide 17 subchannel communication lines to 15 SSD's and 16 disk units. Each maximum of seven (7) subchannel lines (software addresses) whereby the initial subchannel is used to provide SSD addresses. This is done using the hexadecimal system, 0 through 9 and A through F, in FIG. 2.

The first series of numbers 0 through 9 and A through F shown at the extreme left side of the BMC 202 is used such that the "0" address is used to address the storage control device involved (SCU 102, 100) and also to initialize it. The numbers 1 through 9 and A through F (hexadecimal) represent the subchannels involved for addressing the SSD which is located in the cache memory 104.

The next sequence of numbers 0 through 9 and A through F designate a channel used to address particular disk units, where an express grouping is based on rotating disks (in groups of seven). The first grouping 10-70 shows the subchannels for disk 0, marked 10 through 70 where the first digit number indicates the Request number and the second digit number indicates the disk number.

In FIG. 2, the BMC-IOP 202 shows that each rotating disk as 0, 1, 2, 3, etc . . . to disk 15 has seven (7) subchannels (1 through 7) to provide $7 \times 16 = 112$ subchannels. In addition, the 15 subchannels for the SSD add to the 112 subchannels to provide a total of 127 subchannels to the system plus one subchannel for control.

The subchannels 1014 70 represent the command queue for disk 0 while 11-71 represent the command queue for disk 1, and so on. These are actually groups of subchannels whereby any given disk can have seven I/O requests waiting for future execution concurrently.

As seen in FIG. 2, each group of subchannels connects to the SCU 102 which operates on the FIPS protocol 97 which is a device-specific protocol. It will be seen that each of the groups of subchannels from the BMC interface 202 connects to an input on the SCU 102 which is indicated as numbers 0 through 9 and A through F using the hexadecimal system. Thus the addresses for each one of the 16 disk units can be conveyed to the SCU.

The SCU 102 (100 also) connects to the CSU 104, FIG. 2. The CSU is used as cache memory or SSD, or a combination of both. The CSU's support a maximum of 15 SSD's with addresses ranging from 1 through F hexadecimal.

By use of the BMC interface 202 in conjunction with SCU 102, it is possible to not only address the individual disk units 0 through 15, but also to address the cache memory 104 which includes the SSD unit.

The BMC interface 202, while operating on the FIPS 60 protocol, enables several valuable functions to occur. These are:

1. It allows I/O requests to concurrently handle multiple operations instead of just one operation at a given period of time.
2. It supports a method for "device path selection".
3. It permits the host computer 10 to select separate disk subchannels and permits them to operate simultaneously.

The following FIGS. 7 through 13 indicate the method and procedure for operation of the BMC-IOP 202 of FIG. 2.

The caching capabilities within the hardware and firmware (5056) are controlled and monitored by the Unisys OS1100 software entitled "FBCADIS" which is characteristic of the Unisys Series 1100 computer systems.

The caching capabilities are controlled by utilizing several cache support I/O commands. The FBCADIS initializes the caching environment, monitors the data residing in the cache memory to ensure that the data gets written to disks ("trickled"), detects error conditions within the caching subsystem, makes recovery from error conditions, and terminates the caching environment if an error condition is catastrophic. This software control insures the integrity of all data transfers.

Figure 7:
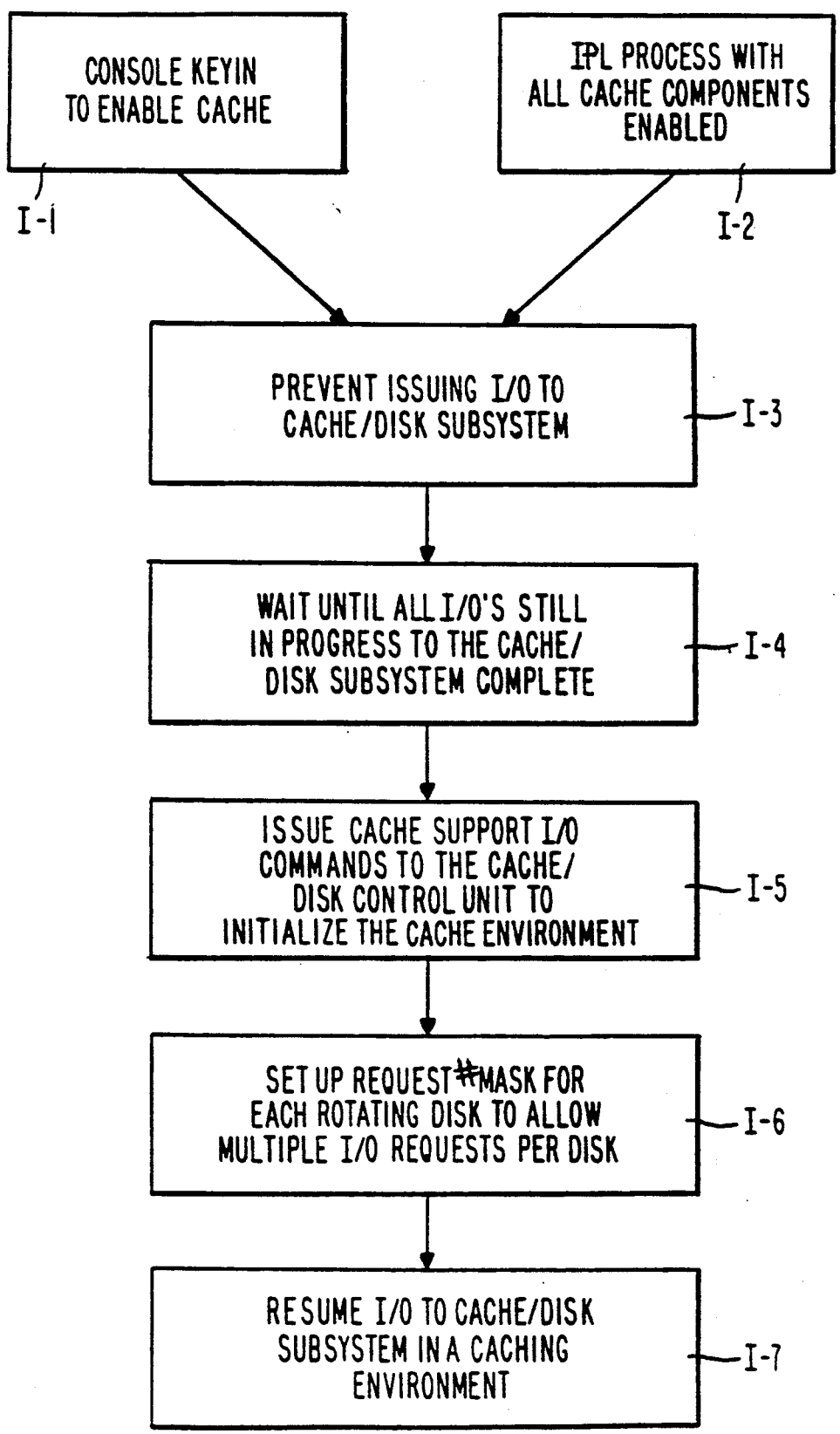

Now referring to FIG. 7, in order to enable a post-store cache environment, the FBCADIS program controls the initialization process of the cache. FBCADIS utilizes cache support I/O commands for the initialization.

As seen in FIG. 7, block I-1 illustrates the operator's action of keying in, on the console, in order to enable the cache program. The block I-2 is the Initial Program Load (IPL) process with all the cache components having been enabled. Thus the cache environment is now prepared for initialization as per FIG. 7.

As seen in block I-3, the first instructions will prevent issuing an I/O command to the cache/disk subsystem. The block labeled I-4 indicates there is a wait period until all I/O commands, which are still in progress to the cache/disk system, are complete.

The block I-5 indicates that the host processor 10 will issue cache support I/O commands to the cache/disk control unit in order to initialize the cache environment.

Figure 9:
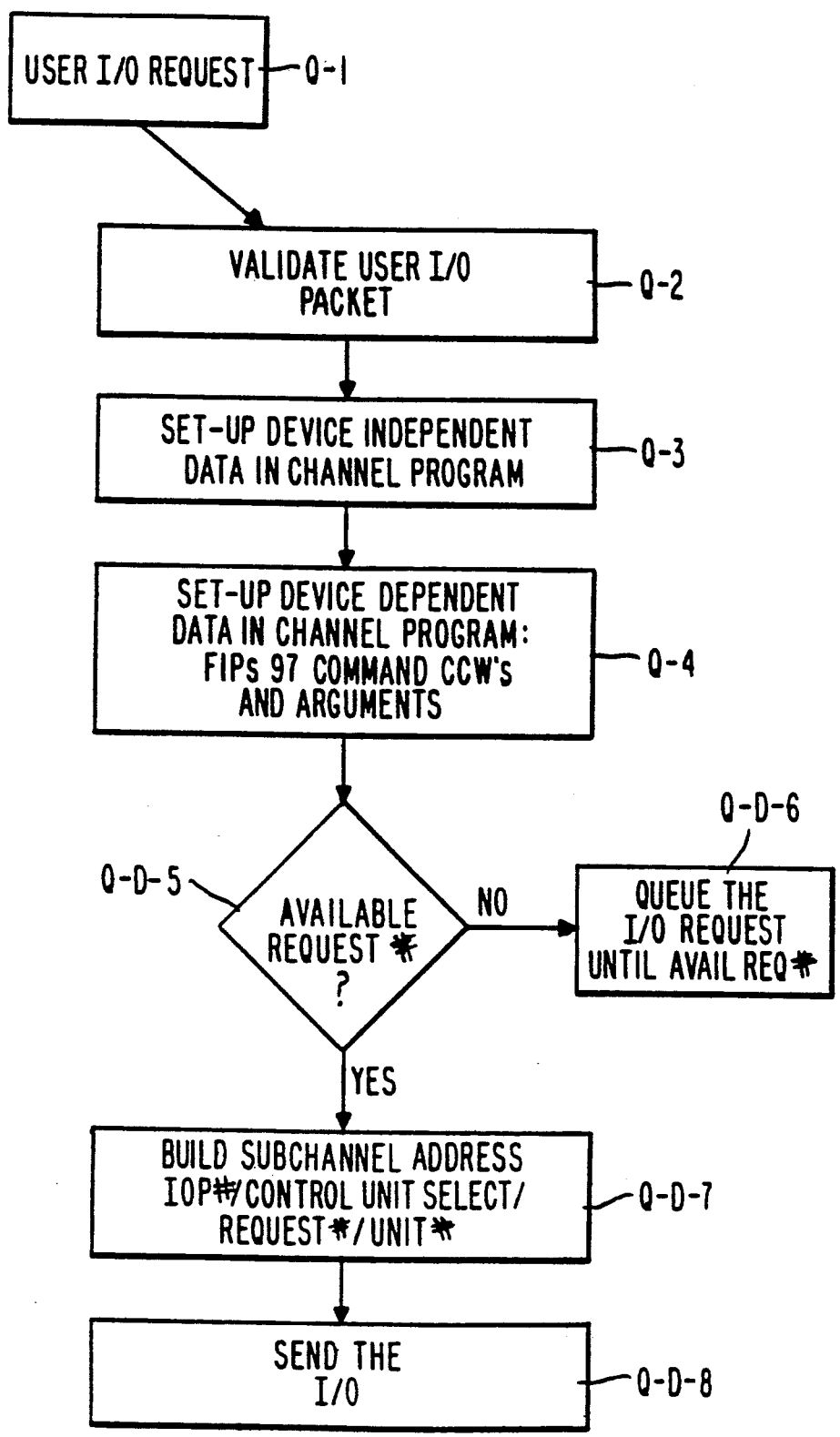

The block I-6 indicates that the processor 10 will set up a request number mask for each rotating disk in order to allow multiple I/O requests per disk. Then block I-7 indicates the program will resume I/O operations to the cache/disk subsystem in a caching environment, such as indicated in FIG. 9 at block 0-1.

Figure 8:
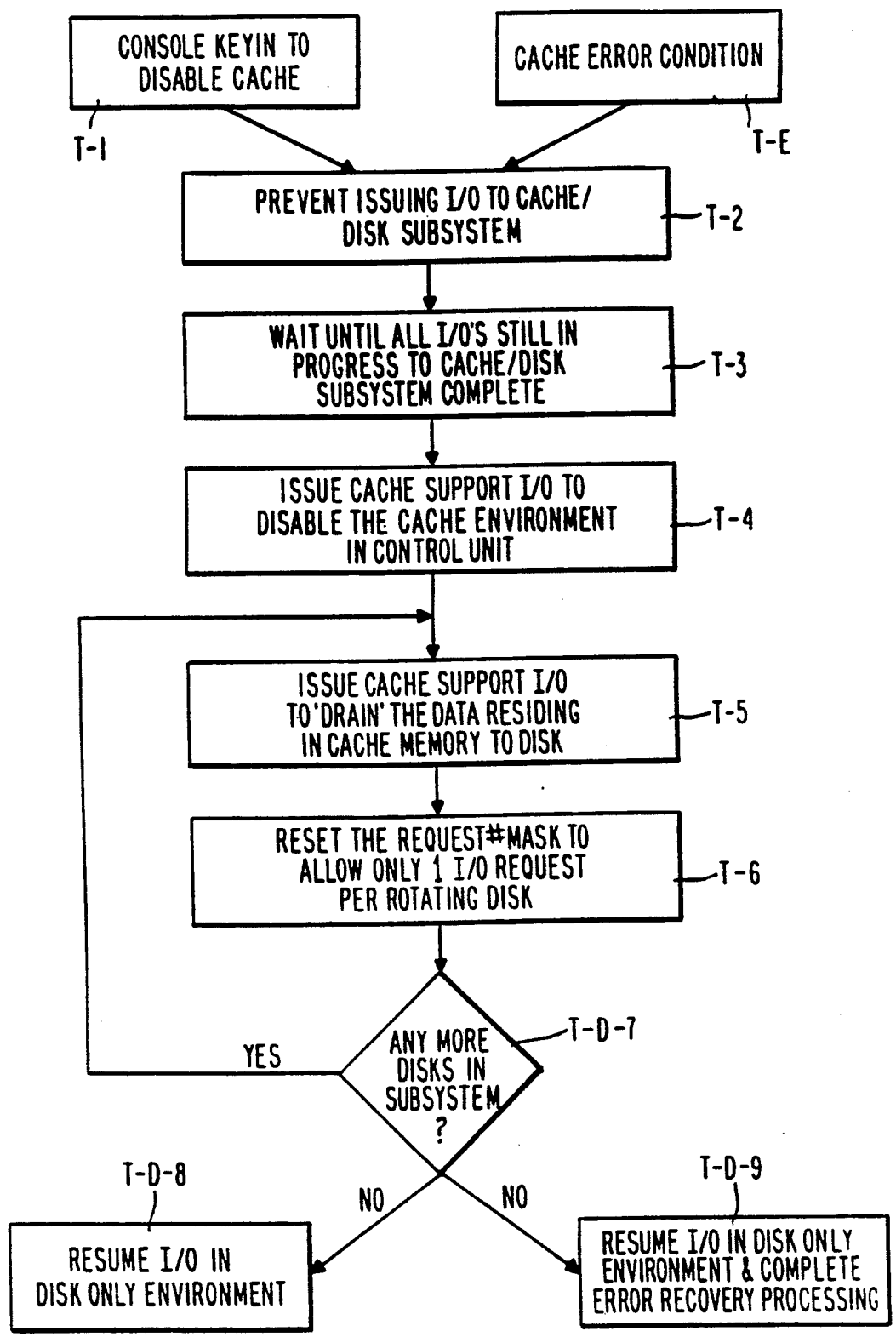

Referring to FIG. 8, there is indicated the procedures for termination of the cache environment. Here block T-E indicates the cache error condition, while block T-1 indicates the operator's action to key in the console in order to disable the cache. In the cache error condition (T-E), the SCU 102 has sensed an error in cache memory 104. The SCU reports this to host 10 which then initiates the termination (disconnection) of the cache subsystem.

The block indicated at T-2 indicates the instruction to prevent issuing an I/O command to the cache/disk subsystem, and block T-3 indicates the waiting period until all the I/O commands, still in progress to the cache/disk subsystem, are complete. Block T-4 indicates that the host processor 10 will issue a cache support I/O command in order to disable the cache environment in the SCU 102.

Block T-5 indicates that the host processor 10 will issue a cache support I/O command in order to "drain" the data residing in cache memory 104 back to each appropriate disk unit. Then block T-6 indicates that the host processor 10 will reset the request number mask in order to now allow only one I/O request per rotating disk. This is called the "disk-only" mode.

The decision block T-D-7 allows each disk in the subsystem to be "chained". When all the disks have been processed, then the program operates to block T-D-8 in order to resume the input operations in the disk-only environment; subsequently at block T-D-9, there is a resumption to I/O operations in the "disk-only" environment after complete error recovery processing.

Thus, in order to disable a "post-store cache" environment and to revert to a "disk-only" mode of operation, the FBCADIS program sets up the termination process operation where cache support I/O subcommands are utilized during the process.

Figure 10:
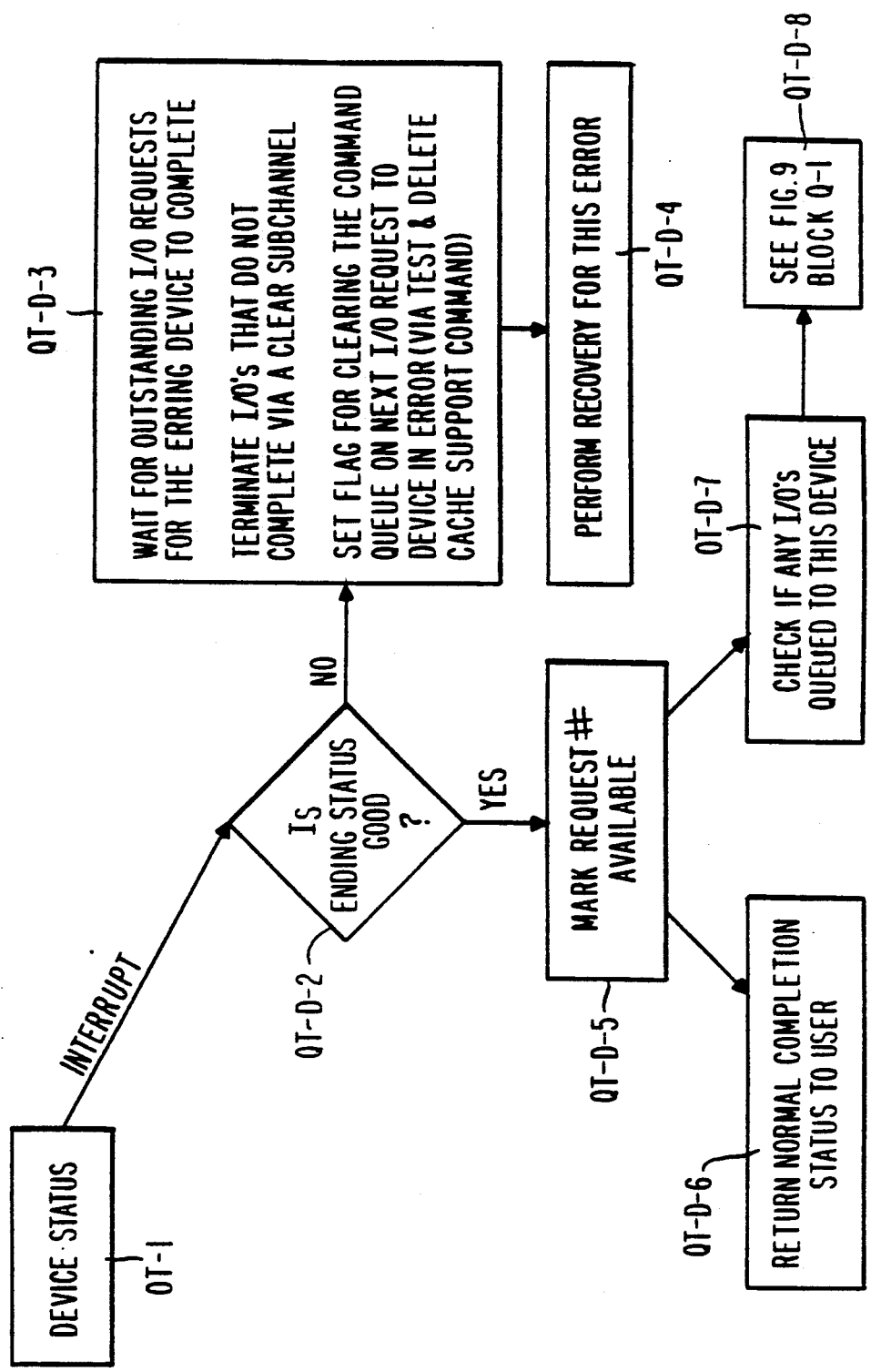

Now, with reference to FIGS. 9 and 10 which involve I/O initiation and I/O termination: multiple I/O requests can be issued to a single disk drive, where seven is the maximum. The FBCADIS software controls this by monitoring the available request numbers per disk. If none of the disks are available, the I/O request is queued.

The I/O "completion status" is received by host processor 10 via the subchannel address. Upon good completion, the request number is marked as "available" and the next I/O command can be issued using the available request number.

Upon error completion, all outstanding I/O requests to the erring device are given an opportunity to be completed. If they do not complete, the subchannels are idled. The erring device is marked so that the next I/O command, issued to this device, will be a cache support I/O command (called Test and Delete) that will flush the command queue. This is followed by error recovery processing required for the error condition.

Referring to FIG. 9, the block designated 0-1 is the user I/O request. Block 0-2 is the operation by the operating system to validate the user I/O packet. The "User I/O Packet" involves certain parameters which include (a) the File Name of the disk segment; (b) a Read or Write operator; and (c) the word count of words to be transferred.

Block 0-3 is where the operating system sets up device-independent data in the Channel Program. The Channel Program is located in the host's main memory which consists of device-independent and device-dependent information. The "independent" data is the same for all disk units while the "device-dependent" data apply only to a specifically particular disk, i.e., the channel command words (CCW) and their arguments.

Block 0-4 indicates the host program will set up device-dependent data in the Channel Program which includes the FIPS (97) command CCW's and arguments.

The decision block 0-D-5 is a query as to the availability of a request number. The request mask is checked to see if a subchannel address is available. FIG. 6 indicates the type of subchannel address. If no request number is available, then block 0-D-6 comes up into effect to queue the I/O request to a list until a request number becomes available.

If the request number is available, then block 0-D-7 indicates that the program builds the subchannel address to indicate the "BMC-IOP number/the control unit select/the request number/the unit number" details. Then in block 0-D-8, when the subchannel address is built, the operating system will transmit and send the I/O command through the channel to the specific subchannel, where the SCU 102 can operate to accomplish the connection to the appropriate disk for data transfers.

Referring to the I/O termination sequence shown in FIG. 10, the block OT-1 indicates that the "device status" information from SCU 102 is conveyed via BMC interface 202 to host processor 10 after completion of an I/O operation. The device status is queried at the decision block OT-D-2 in order to determine whether the ending status is good or not. If not, then the operating system reverts to block OT-D-3 where there is a waiting period for outstanding I/O requests to be completed for the erring device; and also there is a termination of I/O commands that do not complete via a clear subchannel; also there is the setting of a flag for clearing the command queue on the next I/O request to the device in error (via the Test and Delete Cache support command) after which block OT-D-4 comes into play where the program will perform the recovery for this error.

Returning to the decision block OT-D-2, if the ending status is good, then block OT-D-5 comes into operation where the request number is made available which indicates that the I/O is complete. In block OT-D-6, there is a return of the normal completion status to the user and as shown in block OT-D-7, the system simultaneously checks to see if any I/O commands are queued to this particular disk device. Then, as seen in block OT-D-8, the user program is activated, as per FIG. 9 in block 0-1, and notified of the completion.

Figure 11:
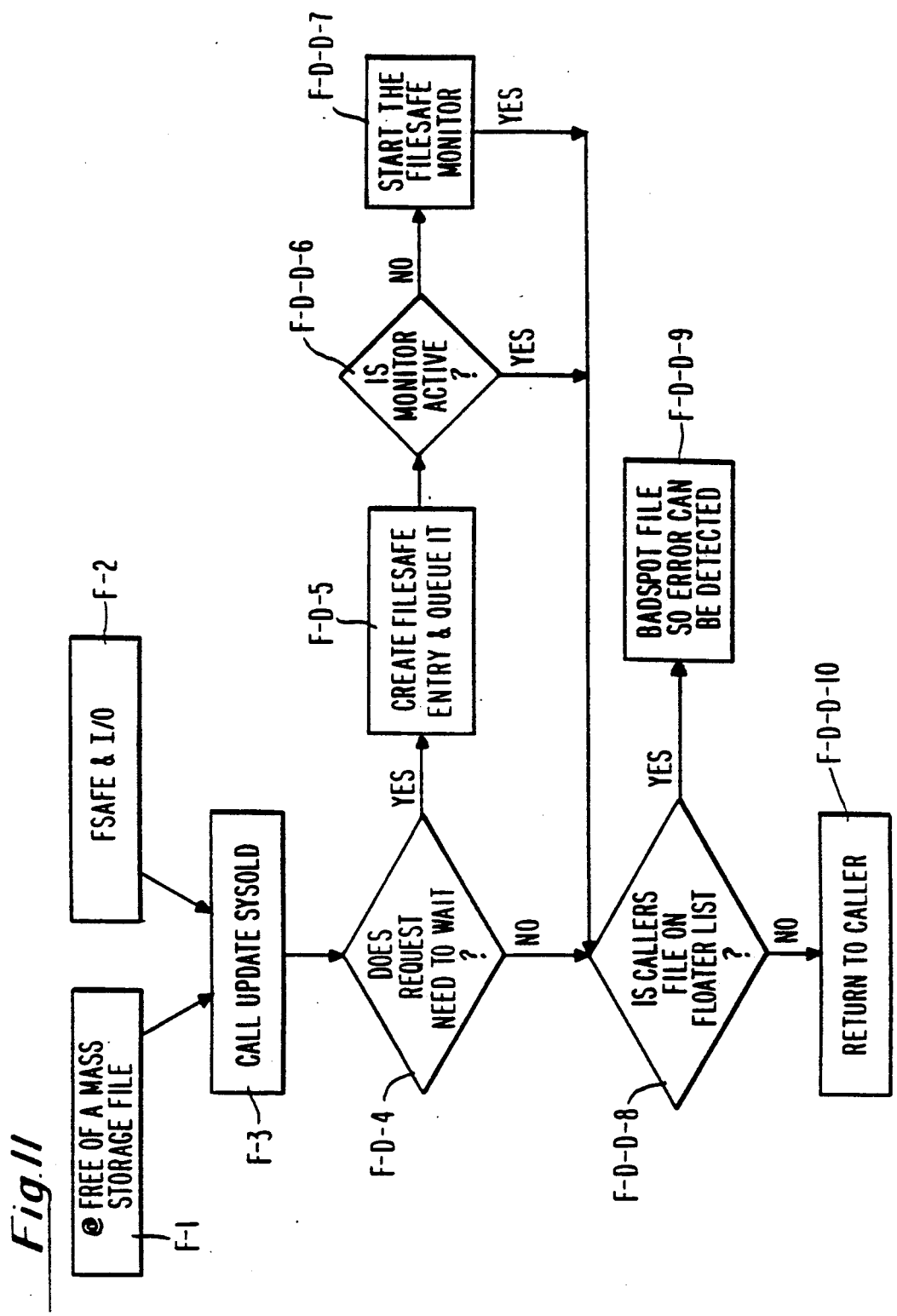

FIG. 11 indicates the sequence for the FILESAFE flow, which involves the concept of returning data from the cache to the disk where it will be "safe" from loss in the event of cache memory wipeout.

Figure 12:
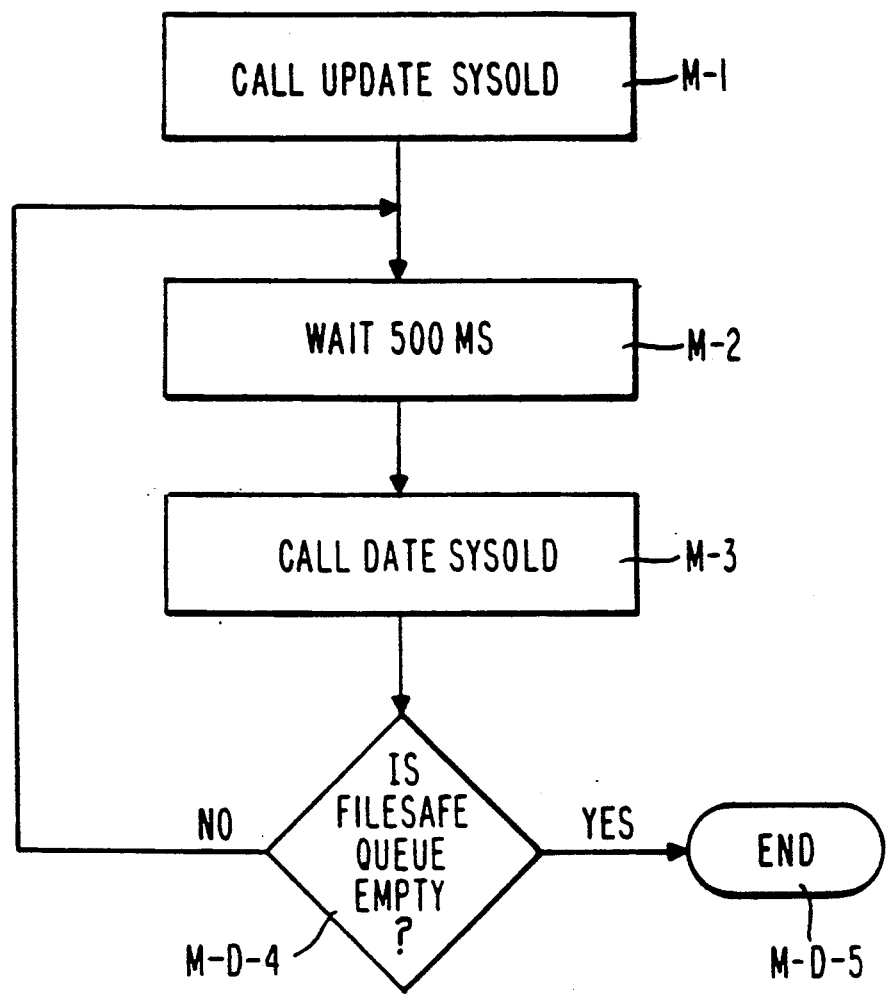

FIG. 12 indicates the sequence for the FILESAFE MONITOR. This involves the checking of data in cache memory so that a true copy of this data can be returned to disk as soon as possible.

FIG. 13 indicates the sequence for updating the "categorization" of the cache data designated as UPDATE and SYSOLD.

The FBCADIS program monitors the data residing in cache in order to insure the integrity of the cache. When a post-store cache is enabled, the FBCADIS software feature of the operating system issues a "cache support I/O command" in order to get the "oldest" time stamp of segments in the cache unit. This "time stamp" allows the software to monitor the "age" of the data residing in cache memory 104.

If the time stamp has stopped "advancing" (as described in connection with FIG. 13), the data in cache is not "trickling" back out to the disk. If this "trickle-stop" condition is detected, the FBCADIS software attempts to determine the cause.

One cause is attributed to a "floater" condition. A floater occurs when the data cannot be trickled back to a disk because of a disk error. The software issues a cache supplemental I/O command to find such a "floater segment" in the cache. If one such floater segment exists, then floater entries are built, as described in FIGS. 11 and 12 hereinafter.

To insure that the time stamp mechanism in the control unit is operative, the FBCADIS software issues another cache support I/O command.

Referring to FIG. 11 involving the FILESAFE flow, the block F-1 indicates the condition where the system is freeing a mass storage file. This is meant to indicate that, regarding a certain segment or disk area associated with a file, there is no present intention to write data into that file space by a particular user. Block F-2 indicates a FILESAFE I/O operation which is to be done via an I/O Request, such as from block 0-1 of FIG. 9.

Block F-3 indicates that the program (as indicated in FIG. 13) is called to see which data segment in cache 104 has the "oldest" time stamp.

Block F-D-4 is a decision block where the program queries whether the request needs to wait a period. If there is a need to wait, then block F-D-5 indicates the program is to create a FILESAFE entry (which identifies a block or multiple blocks in cache 104) and to (temporarily) queue it; after which the decision block F-D-D-6 presents the query as to whether the "monitor" is active as developed by FIG. 12. If not, block F-D-D-7 indicates that the program should start the FILESAFE MONITOR of FIG. 12.

If the Monitor "is active" in block F-D-D-6, the program initiates block F-D-D-8 which is another decision block querying whether the caller's file (blocks F-1 and F-2) is on the cache floater list.

Returning to decision block F-D-4, if there is no need to wait because block F-1 indicates "free" and block F-2 indicates an I/O request FILESAFE, then the program initiates the next decision block which is F-D-D-8. With block F-D-D-8, if the caller's file is on the "floater list", then block F-D-D-9 comes into play to initiate the program for finding the "bad spot" in the file segment so that the error can be detected. This is done on a file recovery operation where a table on the disk identifies the tracks on the disk which have an error problem.

If the caller's file is not on the floater's list, then block F-D-D-10 comes into play to return the program to the original calling program, which was indicated in blocks F-1 and F-2 of FIG. 11. Thus, another sequence of UPDATE SYSOLD occurs (block F-3 which includes FIG. 13) to generate at least three sets of time stamps for comparing blocks U-1 and U-2 of FIG. 13.

Now referring to FIG. 12 which involves the sequence for FILESAFE MONITOR, as seen in block M-1, the program calls for the data residing in cache having the "oldest time stamp" for that segment. Block M-2 indicates a 500-nanosecond wait after which block M-3 indicates another request call for the segment in cache having the oldest time stamp.

Decision block M-D-4 indicates the program query as to whether the FILESAFE queue is empty. If so, the program is ended at block M-D-5. If not empty, then the program returns to block M-2. This sequence of FIG. 12 should be seen as that part of FIG. 11 designated as block F-D-D-7.

Now referring to the program sequence shown in FIG. 13 and designated UPDATE and SYSOLD which resides in the main memory of host processor 10: As seen in block U-1, the program will request the immediately current time information from host processor 10, after which, as seen in block U-2, the program will issue the cache support I/O request (using the FIPS-compliant SET DIAGNOSE command) in order to get the "oldest segment" in cache memory which has been "written-to"; then the decision block U-D-3 will instigate a query to compare the time stamps between block U-1 and block U-2, and to see if the time gap between U-1 and U-2 is advancing (increasing) or not.

The "Time Stamp" operation involves the comparison between two sets of time stamps which may be designated as U-1 and U-2. For example, if the time stamp for U-1 increases from .10:01 to 10:02 and 10:03 while at the same time the corresponding U-2 time stamp goes from 9:50 to remain at 9:50 to remain at 9:50 again (in order to show that there is "no advance"), that means that there is a "larger gap" or an increasing gap between the time stamps for U-1 and the time stamps for U-2, indicating no movement of cache data back to disk, i.e., no trickle. The SCU 102 searches the cache 104 for the oldest time stamp as indicated in block U-2.

If the time gap is "not advancing", then the block U-D-4 will issue the cache support I/O command to get the oldest segment (written-to [WT]) in cache which is found to be in error, after which the decision block U-D-D-5 presents the query as to whether a floater exists. If so, then block U-D-D-6 will operate so that SCU 102 will build a "floater list" entry and add it to the list in main memory of host processor 10, after which the block U-D-D-7 operates to issue the cache support I/O command (to SCU 102 to remove the floater information) in order to allow the time stamp to advance; then the program returns to block U-1.

At decision block U-D-D-5, if a floater does not exist, then block U-D-D-8 indicates a waiting period (to give the SCU 102 time to become available) is presented after which another decision block U-D-D-9 presents the query as to whether the time stamp is advancing or not. If yes, the program returns to block U-1. If no, the program reverts to block U-D-D-D-10 which indicates an error in the SCU 102 so that the data must be drained back to each disk device in the subsystem,–that is to say, that any error data residing in the cache must now be returned to the appropriate disk segment for later correction.

Returning to decision block U-D-3, if the time stamp is advancing, then block U-D-11 indicates that the program will remove the FILESAFE entry from the queue (block F-D-5 in FIG. 11) after which block U-D-12 will return a message to the caller (FILESAFE F-1 or File Monitor F-2, FIG. 11) with the "current" time, with the "oldest segment" time, and with the "oldest floater" time.

There has been described herein an environment wherein a BMC interface is provided with a software program which enables it to operate to use a cache/disk memory function whereby the host processor is granted faster and more immediate access to blocks of data which are determined to be of most recurring use at any given period.

The system operates such that data is taken from disks and placed into electronic cache memory units and given a time stamp to indicate which segments of data (from the disk) have been most recently used and which have been least recently used so that a continuous process is effectuated to keep the most recently used data and return the least recently used data back to disk storage.

Additionally, any data from disk which resides in cache and which is determined to be in error will be returned to the appropriate disk segment for correction, while any block of data taken from segments of disk data which reside in the cache memory are always returned back, when time is available, to the appropriate disk segments to insure that the data will always reside in the disk and not merely in the cache memory thus to insure that any damage or inoperability of the cache memory will not deny or lose the blocks of data segments which originally resided in the disk memory units.

Thus, the software methods and procedures, in providing these functions, also insure that disk units operating under the FIPS 97 protocol will be translated into the appropriate FIPS 60 protocol suitable for the main host computer while any data from the main host computer in the FIPS 60 protocol of the main host computer will be converted into the appropriate FIPS 97 protocol for storage on the appropriate disk units.

While the described embodiment has been shown and described with reference to a preferred embodiment, it will be understood by those skilled in the art that various changes in form and detail may be made without departing from the spirit and scope of the invention as defined in the following claims.

What is claimed:

1. In a cache/disk memory subsystem, connected to a main host computer, wherein a block multiplexor channel interface and a storage control unit, connected to a cache memory, provide channels, compatible with FIPS protocol, from said host computer to a plurality of disk units whereby the cache/disk memory subsystem can operate in a cache mode or disk-only mode, a method of instructing a computer in FIPS-compatible data transfer comprising the steps of:
   (a) initializing said cache/disk subsystem after all I/O operations in progress are completed, in order to enable the operation of the cache memory function;
   (b) initiating a user's I/O request and developing via said host computer, a FIPS 97 I/O data transfer command to said block multiplexor channel interface compatible with FIPS 60 protocol;
   (b1) generating, via said block multiplexor channel interface, FIPS compatible instructions to said storage control unit to enable a post store cache operation capability wherein said FIPS compatible generating instructions include:
      (b1a) a FIPS 97 SET DIAGNOSE/DEFINE MODIFIERS command;
   (c) executing said I/O data transfer command.

2. The method of claim 1 wherein said initializing of said cache/disk subsystem includes the steps of:
   (a) inhibiting the issue of I/O request commands to said cache/disk subsystem until after the completion of all existing I/O request commands in progress to the cache/disk subsystem;
   (b) issuing cache support I/O request commands to enable the cache memory environment;
   (c) generating request number lists for each disk drive unit to queue multiple I/O requests for each disk unit;
   (d) enabling the execution of I/O commands for use with the cache/disk subsystem.

3. The method of claim 1 which includes the steps of:
   (a) inhibiting any I/O commands to be issued to said cache/disk subsystem;
   (b) permitting all I/O commands in progress, to said cache/disk subsystem, to be completed;
   (c) disabling the use of said cache memory function;

(d) generating a cache I/O command to drain data from said cache memory back to the original disk unit from whence it came;

(e) resetting the request number list to permit only one I/O request for each rotating disk;

(f) enabling I/O operation limited to a disk-only (non-cache memory) environment.

4. The method of claim 2 wherein enabling the execution of I/O commands includes the steps of:

(a) receiving an I/O request command from said host computer to said disk drive unit;

(b) checking and validating the user I/O packet which identifies the disk unit, the data segment specified location, and the transfer length of data;

(c) calling a channel program to identify a block of device-independent data for enabling data transfer operations;

(d) identifying device-dependent data to establish channel command words for said I/O request;

(e) checking to identify the request number for the I/O request command;

(f) generating a subchannel address which identifies the I/O processor channel, the storage control unit select number, the I/O request number and the disk unit number;

(g) transmitting the selected I/O request command to the said storage control unit for execution.

* * * * *